(12) United States Patent  
Qiu et al.

(10) Patent No.: US 11,978,188 B2
(45) Date of Patent: May 7, 2024

(54) METHOD AND SYSTEM FOR GRAPH LEVEL ANOMALY DETECTION

(71) Applicant: Robert Bosch GmbH, Stuttgart (DE)

(72) Inventors: Chen Qiu, Sindelfingen (DE); Maja Rudolph, Madison, WI (US)

(73) Assignee: Robert Bosch GmbH (DE)

( * ) Notice: Subject to any disclaimer, the term of this patent is extended or adjusted under 35 U.S.C. 154(b) by 73 days.

(21) Appl. No.: 17/734,067

(22) Filed: May 1, 2022

(65) Prior Publication Data

US 2023/0351572 A1 Nov. 2, 2023

(51) Int. Cl.
*G06F 18/20* (2023.01)
*G06N 3/045* (2023.01)
*G06N 3/08* (2023.01)
*G06T 7/00* (2017.01)

(52) U.S. Cl.
CPC ............ *G06T 7/0002* (2013.01); *G06F 18/29* (2023.01); *G06N 3/045* (2023.01); *G06N 3/08* (2013.01); *G06T 2207/20072* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 2017/0132526 A1* | 5/2017 | Cohen | G06N 20/00 |
| 2019/0304069 A1* | 10/2019 | Vogels | G06N 5/046 |
| 2021/0390393 A1* | 12/2021 | Huang | G06F 18/29 |
| 2022/0164585 A1* | 5/2022 | Ayvaci | G06N 3/08 |

OTHER PUBLICATIONS

Li, Wenkai; StackVAE-G: An efficient and interpretable model for time series anomaly detection; Feb. 2022; AI Open; vol. 3; p. 101-110; https://arxiv.org/ftp/arxiv/papers/2105/2105.08397.pdf (Year: 2022).*

Kan, Shichao; Local Semantic Correlation Modeling Over Graph Neural Networks for Deep Feature Embedding and Image Retrieval; Apr. 2022; IEEE Transactions on Image Processing, vol. 31; p. 2988-3002; https://ieeexplore.IEEE.org/stamp/stamp.jsp? tp=&arnumber=9749974 (Year: 2022).*

Weng, Xinshuo; PTP: Parallelized Tracking and Prediction With Graph Neural Networks and Diversity Sampling; Jul. 2021; IEEE Robotics and Automation Letters; vol. 6; p. 4640-4646; https://ieeexplore.ieee.org/stamp/stamp.jsp?tp=&arnumber=9387598 (Year: 2021).*

(Continued)

*Primary Examiner* — Joni Hsu
(74) *Attorney, Agent, or Firm* — Dickinson Wright PLLC

(57) ABSTRACT

A computer-implemented method of anomaly detection associated with graphical data includes receiving as input one or more input data sets, wherein the input data sets includes one or more graphs, utilizing a plurality of graph neural networks (GNNs) to identify an aggregate loss including a first loss and second loss associated with the input data set, wherein the aggregate loss is associated with embedding's of the GNNs, and outputting a notification associated with an anomaly detection when the first and second loss exceeds an anomaly-detection threshold.

19 Claims, 9 Drawing Sheets

(56) References Cited

OTHER PUBLICATIONS

Perera, Pramuditha; One-Class Classification: A Survey; Jan. 2021; ArXiv; p. 1-16; https://arxiv.org/pdf/2101.03064.pdf (Year: 2021).*
Akoglu et al., "Graph-based Anomaly Detection and Description: A Survey", arXiv:1404.4679v2 [cs.SI] Apr. 28, 2014, 68 Pages.
Bergman et al., "Classification-Based Anomaly Detection for General Data", Published as a conference paper at ICLR 2020, 12 Pages.
Cai et al., "GraphNorm: A Principled Approach to Accelerating Graph Neural Network Training", arXiv:2009.03294v1 [cs.LG] Sep. 7, 2020, 25 Pages.
Chen et al., "Unsupervised Detection of Lesions in Brain MRI using constrained adversarial auto-encoders", 1st Medical Imaging for Deep Learning (MIDL 2018), Amsterdam, Netherlands, 9 Pages.
Chen et al., "A Simple Framework for Contrastive Learning of Visual Representations", Proceedings of the 37 th International Conference on Machine Learning, Vienna, Austria, PMLR 119, 2020, 11 Pages.
Chong et al., "Simple and Effective Prevention of Mode Collapse in Deep One-Class Classification", International Joint Conference on Neural Networks (IJCNN). IEEE 2020, 9 Pages.
Deecke et al., "Image Anomaly Detection with Generative Adversarial Networks", Joint european conference on machine learning and knowledge discovery in databases 2018, 16 Pages.
Ding et al., "Inductive Anomaly Detection on Attributed Networks", Proceedings of the Twenty-Ninth International Joint Conference on Artificial Intelligence 2020 (IJCAI-20), pp. 1288-1294.
Ding et al., "Deep Anomaly Detection on Attributed Networks", Proceedings of the 2019 SIAM International Conference on Data Mining. SIAM, 9 Pages.
Errica et al., "A Fair Comparison of Graph Neural Networks for Graph Classification", Published as a conference paper at ICLR 2020, 14 Pages.
Fey et al., "Fast Graph Representation Learning With Pytorch Geometric", Published as a workshop paper at ICLR 2019, 9 Pages.
Golan et al., "Deep Anomaly Detection Using Geometric Transformations", 32nd Conference on Neural Information Processing Systems (NeurIPS 2018), Montréal, Canada, 12 Pages.
Goyal et al., "DROCC: Deep Robust One-Class Classification", Proceedings of the 37 th International Conference on Machine Learning, Online, PMLR 119, 2020, 11 Pages.
Hassani et al., "Contrastive Multi-View Representation Learning on Graphs", Proceedings of the 37 th International Conference on Machine Learning, Online, PMLR 119, 2020, 11 Pages.
He et al., "Momentum Contrast for Unsupervised Visual Representation Learning", Proceedings of the IEEE/CVF Conference on Computer Vision and Pattern Recognition 2020, pp. 9729-9738.
Hendrycks et al., "Using Self-Supervised Learning Can Improve Model Robustness and Uncertainty", 33rd Conference on Neural Information Processing Systems (NeurIPS 2019), Vancouver, Canada, 13 Pages.
Kipf et al., "Semi-Supervised Classification With Graph Convolutional Networks", Published as a conference paper at ICLR 2017, 14 Pages.
Kumagai et al., "Semi-supervised Anomaly Detection on Attributed Graphs", arXiv:2002.12011v1 [stat.ML] Feb. 27, 2020, 10 Pages.
Liu et al., "Generative Adversarial Active Learning for Unsupervised Outlier Detection", IEEE Transactions on Knowledge and Data Engineering, 2019, 13 Pages.
Liznerski et al., "Explainable Deep One-Class Classification", Published as a conference paper at ICLR 2021, 25 Pages.
Manevitz et al., "One-Class SVMs for Document Classification", Journal of Machine Learning Research 2001, vol. 2, pp. 139-154.
Morris et al., "TUDataset: A collection of benchmark datasets for learning with graphs", Graph Representation Learning and Beyond (GRL+), ICML 2020 Workshop, 11 Pages.
Narayanan et al., "graph2vec: Learning Distributed Representations of Graphs", arXiv:1707.05005v1 [cs.AI] Jul. 17, 2017, 8 Pages.
Neumann et al., "Propagation kernels: efficient graph kernels from propagated information", Mach. Learn. 2016, vol. 102, pp. 209-245.
Noumir et al., "On Simple One-Class Classification Methods", IEEE International Symposium on Information Theory Proceedings. IEEE 2012, pp. 2022-2026.
Principi et al., "Acoustic Novelty Detection with Adversarial Autoencoders", International Joint Conference on Neural Networks (IJCNN). IEEE 2017, 7 Pages.
Qiu et al., "Neural Transformation Learning for Deep Anomaly Detection Beyond Images", arXiv:2103.16440v1 [cs.LG] Mar. 30, 2021, 20 Pages.
Rozemberczki et al., "Karate Club: An API Oriented Open-Source Python Framework for Unsupervised Learning on Graphs", CIKM '20, Oct. 19-23, 2020, Virtual Event, Ireland, 8 Pages.
Ruff et al., "Deep One-Class Classification", Proceedings of the 35 th International Conference on Machine Learning, Stockholm, Sweden, PMLR 80, 2018, 10 Pages.
Ruff et al., "A Unifying Review of Deep and Shallow Anomaly Detection", Proceedings of the IEEE May 2021, vol. 109, No. 5, pp. 756-795.
Schirrmeister et al., "Understanding Anomaly Detection with Deep Invertible Networks through Hierarchies of Distributions and Features", 34th Conference on Neural Information Processing Systems (NeurIPS 2020), Vancouver, Canada, 12 Pages.
Schlegl et al., "Unsupervised Anomaly Detection with Generative Adversarial Networks to Guide Marker Discovery", International conference on information processing in medical imaging 2017, 13 Pages.
Sehwag et al., "SSD: A Unified Framework for Selfsupervised Outlier Detection", International Conference on Learning Representations 2017, 17 Pages.
Shervashidze et al., "Weisfeiler-Lehman Graph Kernels", Journal of Machine Learning Research 2011, vol. 12, pp. 2539-2561.
Siglidis et al., "GraKeL: A Graph Kernel Library in Python", Journal of Machine Learning Research 2020, vol. 21, pp. 1-5.
Sohn et al., "Learning and Evaluating Representations for Deep One-Class Classification", International Conference on Learning Representations 2020, 32 Pages.
Stone., "Cross-Validatory Choice and Assessment of Statistical Predictions", Journal of the Royal Statistical Society. Series B (Methodological) 1974, vol. 36, No. 2, pp. 111-147.
Su et al., "Robust Anomaly Detection for Multivariate Time Series through Stochastic Recurrent Neural Network", KDD'19, Aug. 4-8, 2019, Anchorage, Ak, USA, 10 Pages.
Sun et al., "Infograph: Unsupervised and Semi-Supervised Graph-Level Representation Learning Via Mutual Information Maximization", International Conference on Learning Representations 2020, 16 Pages.
Tack et al., "CSI: Novelty Detection via Contrastive Learning on Distributionally Shifted Instances", 34th Conference on Neural Information Processing Systems (NeurIPS 2020), Vancouver, Canada, 14 Pages.
Verma et al., "Hunt For The Unique, Stable, Sparse and Fast Feature Learning on Graphs", 31st Conference on Neural Information Processing Systems (NIPS 2017), Long Beach, CA, USA, 11 Pages.
Wang et al., "One-Class Graph Neural Networks for Anomaly Detection in Attributed Networks", arXiv:2002.09594v2 [cs.LG] Jun. 6, 2020, 16 Pages.
Wang et al., "Effective End-to-end Unsupervised Outlier Detection via Inlier Priority of Discriminative Network", 33rd Conference on Neural Information Processing Systems (NeurIPS 2019), Vancouver, Canada, 14 Pages.
Xie et al., "Self-Supervised Learning of Graph Neural Networks: A Unified Review", arXiv:2102.10757v1 [cs.LG] Feb. 22, 2021, 17 Pages.
Xu et al., "Representation Learning on Graphs with Jumping Knowledge Networks", Proceedings of the 35th International Conference on Machine Learning, Stockholm, Sweden, PMLR 80, 2018, 10 Pages.
Xu et al., "How Powerful Are Graph Neural Networks?", International Conference on Learning Representations 2019, 17 Pages.
Yoon et al., "Fast and Accurate Anomaly Detection in Dynamic Graphs with a Two-Pronged Approach", KDD '19, Aug. 4-8, 2019, Anchorage, AK, USA, 11 Pages.

(56) References Cited

OTHER PUBLICATIONS

You et al., "Graph Contrastive Learning Automated", Proceedings of he 38th International Conference on Machine Learning, PMLR 2021, vol. 139, 12 Pages.

You et al., "Graph Contrastive Learning with Augmentations", 34th Conference on Neural Information Processing Systems (NeurIPS 2020), Vancouver, Canada, 12 Pages.

Yu et al., "NetWalk: A Flexible Deep Embedding Approach for Anomaly Detection in Dynamic Networks", KDD 2018, Aug. 19?23, 2018, London, United Kingdom, pp. 2672-2681.

Zhang et al., "Understanding Failures in Out-of-Distribution Detection with Deep Generative Models", Proceedings of the 38 th International Conference on Machine Learning, PMLR 139, 2021, 10 Pages.

Zhao et al., "On Using Classification Datasets to Evaluate Graph Outlier Detection: Peculiar Observations and New Insights", arXiv:2012.12931v3 [cs.LG] May 18, 2021, 30 Pages.

Zhao et al., "Error-Bounded Graph Anomaly Loss for GNNs", CIKM '20, Oct. 19-23, 2020, Virtual Event, Ireland, 10 Pages.

Zheng et al., "AddGraph: Anomaly Detection in Dynamic Graph Using Attention-based Temporal GCN", Proceedings of the Twenty-Eighth International Joint Conference on Artificial Intelligence (IJCAI-19), pp. 4419-4425.

Zhou et al., "Anomaly Detection with Robust Deep Autoencoders", KDD'17, Aug. 13-17, 2017, Halifax, NS, Canada, pp. 665-674.

Zhou et al., "Graph neural networks: A review of methods and applications", AI Open 2020, vol. 1, pp. 57-81.

Zhu et al., "Graph Contrastive Learning with Adaptive Augmentation", WWW '21, Apr. 19-23, 2021, Ljubljana, Slovenia, 12 Pages.

Zong et al., "Deep Autoencoding Gaussian Mixture Model for Unsupervised Anomaly Detection", International Conference on Learning Representations 2018, 19 Pages.

\* cited by examiner

METHOD AND SYSTEM FOR GRAPH LEVEL ANOMALY DETECTION

TECHNICAL FIELD

This disclosure relates generally to a system and method to estimate unknown variables given measurements observed over time in a machine learning system.

BACKGROUND

In data analysis, anomaly detection (also referred to outlier detection) is the identification of specific data, events, or observations which raise suspicions by differing significantly from the majority of the data. Typically the anomalous items will translate to some kind of problem such as a structural defect, faulty operation, malfunction, a medical problem, fraud, or any error or outlier.

A Graph Neural Network (GNN) is a type of neural network which directly operates on the graph structure. A typical application of GNN is node classification, in which every node in the graph is associated with a label. The GNN can then function to compare the graphs or portions thereof where nodes and neighboring nodes can be compared. Graph context and labels of nodes can be predicted using aggregated information. GNNs can also be used to form a feature representation (embedding) of an entire graph.

SUMMARY

A first illustrative embodiment discloses, a computer-implemented method of anomaly detection associated with graphical data includes receiving as input one or more input data sets, wherein the input data sets includes one or more graphs, utilizing a plurality of graph neural networks (GNNs) to identify an aggregate loss including a first loss and second loss associated with the input data set, wherein the aggregate loss is associated with embeddings produced by the GNNs, and outputting a notification associated with an anomaly detection when the first and second loss exceeds an anomaly-detection threshold.

A second illustrative embodiment discloses a computer-implemented method of anomaly detection associated with graphical data. The method includes receiving as input one or more input data sets, wherein the input data sets includes one or more graphs, utilizing a plurality of graph neural networks to identify a loss associated with the input data set, wherein the loss utilizes one or more embeddings associated with the one or more graphs, training a plurality of feature extractors associated with the plurality of graph neural networks in response to the loss, an outputting a trained plurality of graph neural networks in response to the loss exceeding a convergence threshold.

A third illustrative embodiment discloses, a system including a machine-learning network. The system includes an input interface configured to receive input data including graphical representations and a processor. The processor is in communication with the input interface and the processor is programmed to receive as input one or more input data sets, wherein the input data sets includes one or more graphs, utilize a plurality of graph neural networks to identify a first loss and second loss associated with the input data set, train the plurality of graph neural networks in response to the first and second loss, and output a trained graph neural network in response to the first and second loss exceed a convergence threshold.

DETAILED DESCRIPTION

Figure 1:
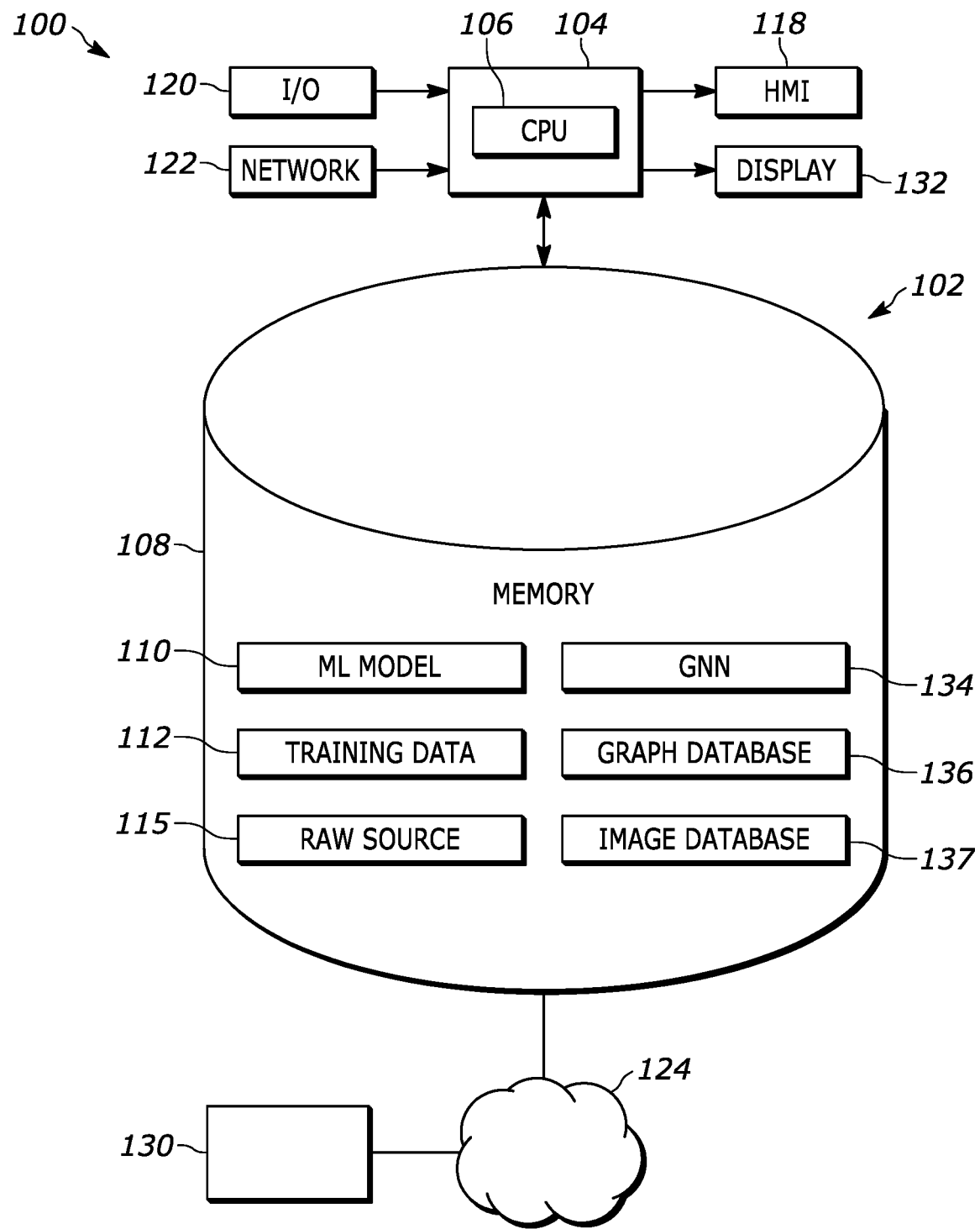
FIG. 1 shows a system for training a neural network, according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term sensor refers to a device which detects or measures a physical property and records, indicates, or otherwise responds to it. The term sensor include an optical, light, imaging, or photon sensor (e.g., a charge-coupled device (CCD), a CMOS active-pixel sensor (APS), infrared sensor (IR), CMOS sensor), an acoustic, sound, or vibration sensor (e.g., microphone, geophone, hydrophone), an automotive sensor (e.g., wheel speed, parking, radar, oxygen, blind spot, torque, LIDAR), a chemical sensor (e.g., ionsensitive field effect transistor (ISFET), oxygen, carbon dioxide, chemiresistor, holographic sensor), an electric current, electric potential, magnetic, or radio frequency sensor (e.g., Hall effect, magnetometer, magnetoresistance, Faraday cup, Galvanometer), an environment, weather, moisture, or humidity sensor (e.g., weather radar, actinometer), a flow, or fluid velocity sensor (e.g., mass air flow sensor, anemometer), an ionizing radiation, or subatomic particles sensor (e.g., ionization chamber, Geiger counter, neutron detector), a navigation sensor (e.g., a global positioning system (GPS) sensor, magneto hydrodynamic (MHD) sensor), a position, angle, displacement, distance, speed, or acceleration sensor (e.g., LIDAR, accelerometer, Ultra-wideband radar, piezoelectric sensor), a force, density, or level sensor (e.g., strain gauge, nuclear density gauge), a thermal, heat, or temperature sensor (e.g., Infrared thermometer, pyrometer, thermocouple, thermistor, microwave radiometer), or other device, module, machine, or subsystem whose purpose is to detect or measure a physical property and record, indicate, or otherwise respond to it.

Specifically, a sensor may measure properties of a time series signal and may include spatial or spatiotemporal aspects such as a location in space. The signal may include electromechanical, sound, light, electromagnetic, RF or other time series data. The technology disclosed in this application can be applied to time series imaging with other sensors, e.g., an antenna for wireless electromagnetic waves, microphone for sound, etc.

The term image refers to a representation or artifact that depicts perception of a physical characteristic (e.g., audible sound, visible light, Infrared light, ultrasound, underwater acoustics), such as a photograph or other two-dimensional picture, that resembles a subject (e.g., a physical object, scene, or property) and thus provides a depiction of it. An image may be multi-dimensional in that in may include components of time, space, intensity, concentration, or other characteristic. For example, an image may include a time series image. This technology can also be extended to image 3-D acoustic sources or objects.

A graph is a data structure consisting of two components—nodes (or vertices) and edges. The nodes may consist or be embedded with associated data such as a classification, and the edges connect adjacent nodes. Graph data structures can be applied in a variety of real-world applications, such as business processes, control flow graphs in programs, social connections, knowledge graphs, and semantic scene graphs in image analysis. Visually identifying and searching for persistent subgraph patterns is a common and important task in graph analysis. For example, searching for graph motifs such as cliques or stars in a social network reveals the community structures or influencers; searching for similar workflow templates helps streamline or simply business processes; searching for images with similar scene graphs helps systematic retrieval of training/testing cases to develop models for computer vision tasks.

Graph-level anomaly detection (AD) includes the task of detecting abnormalities in a set of graphs and is important in various applications, including detecting abnormalities in medical test results, autonomous and semi-autonomous vehicle system operation, in fraud in financial networks and detecting abnormal communities in social networks. This application presents a modern approach to graph-level AD, including concepts such as deep feature extraction, one-class classification, and self-supervision. These paradigms are combined to develop a One-Class Graph Transformation Learning (OCGTL), a novel end-to-end AD method that outperforms all other methods in an extensive empirical study on various real-world datasets. A comprehensive evaluation of nine algorithms (including four new algorithms) on nine real-world datasets repurposed for graph-level AD is presented. The detection rates of the deep-learning-based methods critically rely on the readout function for extracting graph-level representations. In previous work, sub-optimal choices resulted in the so-called "performance flip" issue, which can be mitigated by proper design choices.

Anomaly detection (AD) is an important tool for scanning systems for unknown threats. Many systems (e.g., medical, vehicular, web-based, etc.) are best represented by graphs and there has been work in detecting anomalous nodes and edges within a graph. However, in many applications, it is more relevant to check and verify whether an entire graph is abnormal.

Consider for example, a financial network with nodes representing individuals, businesses, and banks and the edges representing transactions, it might be difficult to detect all criminal activity by looking at individual nodes and edges. Clever criminals can hide their intentions behind innocent-looking transactions. However, the entire network associated with a money laundering scheme is harder to obfuscate and will still exhibit properties of criminal activity. By using tools for graph-level AD, a system may be able to detect an entire criminal network rather than individual entities. Thus, graph-level anomaly detection may be important in real-world tasks from diverse domains such as drug discovery, money laundering (detecting anomalous transaction/interaction graphs in financial networks), molecular synthesis (detecting anomalous molecules based on graph structure), rare human pose detection, fake news detection, traffic event detection, and buggy software detection.

Unfortunately, there has been limited success in adapting advances in deep anomaly detection to graph-level AD. This application addresses this, by assuming access to a large dataset of typical graphs for graph-level AD, such as a dataset of medical interactions or conditions, objects associated with locations, communities in a social network, or a dataset of snapshots of a financial network. Even though the training data could contain anomalies, they are unlabeled. For this reason the entire dataset is considered "normal". The goal is to use the data to learn an anomaly scoring function which can then be used to score how likely it is that a new graph is either normal or abnormal. Importantly, the term graph-level AD refers to detecting entire abnormal graphs, rather than localizing anomalies within graphs.

Recently there has been a trend of using deep learning in AD on images, tabular data, and sequential data. However, there has been limited research on deep AD for graphs. This may seem surprising since it appears straightforward to adopt a deep AD method for tabular data into one for graphs by defining an appropriate feature map. Yet, the resulting methods often perform close to random, and so far, attempts to adopt modern AD methods (based on deep learning) to graph-level AD have not been successful.

In this disclosure, a one-class graph transformation learning (OCGTL) approach for graph level AD is presented that combines deep one-class classification (OCC) and self-supervision to overcome known issues of deep OCC. The OCGTL architecture may include K+1 graph neural networks (GNNs) that are jointly trained on two complementary deep AD losses.

FIG. 1 is a schematic diagram of a visual analytics system 100 that performs subgraph pattern searching with human-in-the-loop visual analytics, according to an embodiment. The system 100 may include at least one computing system 102. The computing system 102 may include at least one processor 104 that is operatively connected to a memory unit 108, or memory. The processor 104 may include one or more integrated circuits that implement the functionality of a central processing unit (CPU) 106. The CPU 106 may be a commercially available processing unit that implements an instruction stet such as one of the x86, ARM, Power, or MIPS instruction set families. During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, a training dataset 112 for the machine-learning model 110, raw source dataset 115, one or more GNNs 134, a graph database 136, an image database 137.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 may be in communication with the external network 124. The one or more servers 130 may have the memory and processors configured to carry out the GNNs and systems disclosed herein.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122. The HMI 118 and display 132 may collectively provide a user interface to the user, which allows interaction between the human user and the processor(s) 104.

The system 100 may be implemented using one or multiple computing systems. While the example depicts a single computing system 102 that implements all of the described features, it is intended that various features and functions may be separated and implemented by multiple computing units in communication with one another. The particular system architecture selected may depend on a variety of factors, and the system illustrated in FIG. 1 is merely an example.

The system 100 may implement a machine-learning algorithm 110 that is configured to analyze the raw source dataset 115. The raw source dataset 115 may include raw or unprocessed sensor data or image data that may be representative of an input dataset for a machine-learning system. The raw source dataset 115 may include video, video segments, images, text-based information, and raw or partially processed sensor data (e.g., radar map of objects). In some examples, the machine-learning algorithm 110 may be a neural network algorithm that is designed to perform a predetermined function. For example, the neural network algorithm may be configured in automotive applications to identify items (e.g., pedestrians, signs, buildings, sky, road, etc.) in images or series of images (e.g., video), and even annotate the images to include labels of such items. The neural network algorithms of the machine-learning algorithm 110 may include GNN, although the GNNs disclosed herein are illustrated as a separate component in memory 108. The machine-learning algorithms 110 and/or GNN may take as input a query graph having a plurality of nodes (e.g., types of objects in the image) connected by edges (e.g., the relationship between those objects), and search for and retrieve corresponding target graphs from the graph database that include the query graph as a subgraph within the stored target graph. The image database 137 contains a plurality of stored images that correspond to the target graphs. Each image in the image database 137 can have pre-defined segmented regions and associated nodes as determined from prior human labeling or machine-learning processes. When a target graph is found to contain the query graph, one of the images from the image database 137 that is associated with the target graph can be retrieved as described herein.

The computer system 100 may store a training dataset 112 for the machine-learning algorithm 110. The training dataset 112 may represent a set of previously constructed data for training the machine-learning algorithm 110. The training dataset 112 may be used by the machine-learning algorithm 110 to learn weighting factors associated with a neural network algorithm. The training dataset 112 may include a set of source data that has corresponding outcomes or results that the machine-learning algorithm 110 tries to duplicate via the learning process. In this example, the training dataset 112 may include source images or videos with and without items in the scene and corresponding presence and location information of the item.

The machine-learning algorithm 110 may be operated in a learning mode using the training dataset 112 as input. The machine-learning algorithm 110 may be executed over a number of iterations using the data from the training dataset 112. With each iteration, the machine-learning algorithm 110 may update internal weighting factors based on the achieved results. For example, the machine-learning algorithm 110 can compare output results (e.g., annotations, latent variables, adversarial noise, etc.) with those included in the training dataset 112. Since the training dataset 112 includes the expected results, the machine-learning algorithm 110 can determine when performance is acceptable. After the machine-learning algorithm 110 achieves a predetermined performance level (e.g., 100% agreement with the outcomes associated with the training dataset 112), the machine-learning algorithm 110 may be executed using data that is not in the training dataset 112. The trained machine-learning algorithm 110 may be applied to new datasets to generate annotated data.

The GNN 134 is a neural network that directly operates on the graph structures stored in graph database 136 (e.g., target graphs) as well as input query graphs. Each node in the graphs are associated with a label. For example, in the context of a stored image, nodes may include labels for pedestrians, signs, buildings, the sky, roads, and the like that are found in the image. The graph structures stored in the graph database 136 may have these labels stored as ground truth, while the input query graphs may include a graph with a desired node or nodes, wherein the GNN is configured to operate to search the target graphs stored in the graph database 126 that include the query graph as a subset within the target graphs.

The system is configured to match a query graph with one or more target graphs stored in the graph database 136. Each graph includes vertices and edges. An undirected, connected graph can be denoted G=(V, E) with vertex set V and edge set E, X as the features associated with V (e.g., categorical attributes).

To study the effectiveness of OCGTL this application presents four ablations of the model that help disentangle the contribution of the different ingredients. Since the OCGTL approach combines deep OCC with self-supervised AD, the ablations draw from these two ideas. The ablation study also includes a one-class GIN (OCGIN). In OCC, samples are mapped into a hypersphere which encapsulates typical samples; everything outside the sphere is considered abnormal. While this produces powerful AD on images, it has not yet achieved satisfactory results in graph-level AD.

As part of an empirical study, carefully investigation of the architectural choices of the GNNs that all the deep AD methods use for feature extraction was considered. Nine methods on nine real-world graph classification datasets repurposed for graph-level AD were considered. This application brings deep AD on graphs up to speed with other domains and contributes a completely new method (OCGTL).

Figure 2:
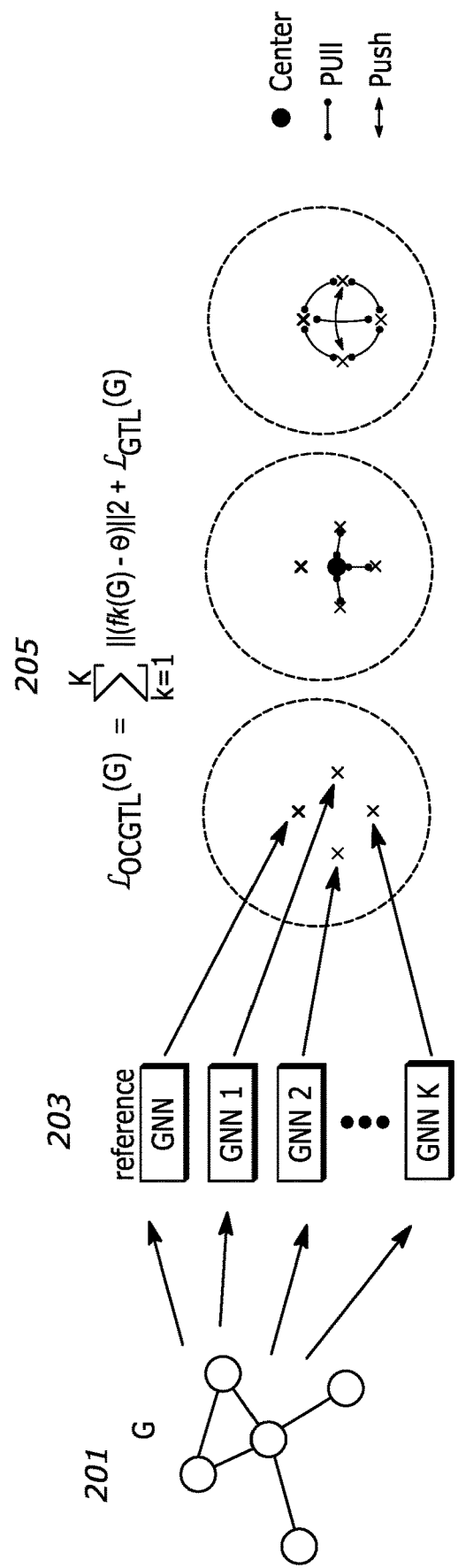
FIG. 2 shows a computer-implemented method for training and utilizing a neural network, according to an embodiment.

FIG. 2 discloses an example of a graph neural network according to an embodiment below. The system may include one or more graphs 201 that are utilized as a data set. The graphs 201 may be various nodes or representations of various data, including images (e.g. with pixels), financial data, etc. Each graph may be embedded by a set of GNNs 203. The GNNS may have up to K representations. The GNNs 203 may be configured to embed each graph 201 to obtain representations, which may be diverse representations.

The system may determine a loss 205 $\mathcal{L}_{OCGTL}(G)=\mathcal{L}_{OCC}(G)+\mathcal{L}_{GTL}(G)$. Such a loss may include two contributions. The first contribution may encourage the embeddings to be close to a center θ. The second loss term may encourage the embeddings to be close to the reference embedding, yet apart from each other. The loss may be used both during training and as an anomaly score.

The OCGTL architecture (such as the embodiment shown in FIG. 2) may include K+1 GNNs 203. These networks may produce K+1 different embeddings given a graph 201 as input. The OCGTL may use two loss contributions that complement each other. An OCC loss may push all the embeddings to be close to the same point. This may be balanced by the transformation learning objective. It may be a contrastive loss that ensures that all the embeddings of the same graph are different from each other while still capturing important characteristics of the original input.

Combining these two losses may advantageous for a number of reasons. First, deep OCC is known to be susceptible to "mode collapse", which is a trivial solution that cannot be used for anomaly detection. The trivial solution is not optimal under the OCGTL objective, which proves that OCGTL resolves this issue. Second, the two loss contributions focus on different notions of distance between the graph embeddings. The OCC loss may rely on Euclidean distances, while the transformation learning loss is sensitive to the angles between embeddings. When the combined loss is used as an anomaly score, this means that it can detect abnormal embedding configurations both in terms of angles between embeddings and in terms of euclidean distances. Finally, the OCGTL may be the first deep one-class method where the center of the one-class loss can be optimized, giving the method an additional degree of freedom.

The OCGTL may include self-supervised AD with learnable transformations, deep OCC, and feature extraction with GNNs. The OCGTL architecture may include a reference feature extractor f and K additional feature extractors $f_k$ (k=1, ..., K), which are trained jointly as shown in FIG. 2. Each of the feature tractors is a parameterized function (e.g. GNN) which takes as input an attributed graph G={ $\mathcal{V}$, $\mathcal{E}$, $\mathcal{X}$ } with vertex set $\mathcal{V}$, edges $\mathcal{E}$, and node features (attributes) $\mathcal{X}=\{x_v | \in \mathcal{V}\}$ and maps it into an embedding space $\mathcal{Z}$. These K+1 feature extractors are trained jointly on the OCGTL loss, $\mathcal{L}_{OCGTL}=\mathbb{E}_G[\mathcal{L}_{OCGTL}(G)]$ Each graph in the training data contributes two terms to the loss, $$\mathcal{L}_{OCGTL}(G)=\mathcal{L}_{OCC}(G)+\mathcal{L}_{GTL}(G). \quad \text{(Equation 1)}$$

The first term, $\mathcal{L}_{OCC}(G)$, may be a one-class term and may encourage all the embeddings to be as close as possible to the same point θ ∈ $\mathcal{Z}$. The second term, $\mathcal{L}_{GTL}$, may enforce each GNN's embeddings to be diverse and semantically meaningful representations of the input graph G.

The Graph Transformation Learning Term Neural transformation learning may be a selfsupervised training objective for deep AD which has success on time series and tabular data. For a graph G, the loss of graph transformation learning encourages the embeddings of each GNN, $f_k(G)$, to be similar to the embedding of the reference GNN, $f_k(G)$, while being dissimilar from each other. Consequently, each GNN $f_k$ is able to extract graph-level features to produce a different view of G. The contribution of each graph to the objective is $$\mathcal{L}_{GTL}(G) = -\sum_{K=1}^{K} \log \frac{c_k}{Ck} \quad \text{(Equation 2)}$$

with $c_k = \exp\left(\frac{1}{T} sim(f_k(G), f(G))\right)$ $$C_k = c_k + \sum_{l \neq k}^{K} \exp\left(\frac{1}{T} sim(f_k(G), f_l(G))\right)$$

where $\tau$ denotes a temperature parameter. The similarity here may be defined as the cosine similarity $sim(z, z^1):=z^T z'/\|z\| \|z'\|$. Note that the above loss is more general than the one proposed above as it omits a parameter sharing constraint between transformations. This choice may include different graph categories that prefer different types of transformations.

With respect to the one-class term, the one-class classification (OCC) may be able to map data into a minimal hypersphere encompassing all normal training data. Data points outside the boundary are considered anomalous. The contribution of each graph G to our OCC objective may be $$\mathcal{L}_{OCC}(G) = \sum_{k=1}^{K} \|(f_k(G) - \theta)\|2 \quad \text{(Equation 3)}$$

The loss function may penalize the distance of the graph G to the center $\theta$ which may be treated as a trainable parameter. In previous deep OCC approaches, the center $\theta$ may be a fixed hyper parameter to avoid trivial solutions to Equation 3(above).

Feature Extraction with GNNs of graph data, parametrizing the feature extractors f and $f_1, \ldots, f_K$ by GNNs is advantageous. At each layer 1, a GNN maintains node representation vectors $h_v^l$ for each node v. The representation may be computed based on the previous layer's representations of v and its neighbors N(v), $$h_v^{(l)} = GNN^l(h_v^{(l-1)}|u \in \mathcal{N}(v)) \quad (4)$$

Each layer's node representations are then combined into layer-specific graph representations, $$h_G^{(l)} = \text{READOUT}^{(l)}(h_v^{(l)}(h_v^{(l)}|v \in G) \quad (5)$$

which are concatenated into graph-level representations, $$h_G^{(1)} = \text{CONCAT}(h_v^{(1)}|l=1, \ldots, L) \quad (6)$$

This concatenation introduces information from various hierarchical levels (Xu et al., 2018b) into the graph representation. Our empirical study in section 4 shows that the choice of the readout function (which determines how the node representations are aggregated into graph representations) is particularly important to detect anomalies reliably.

Anomaly Scoring with OCGTL may be an end-to-end method for graph-level AD. During training the GNNs may be trained on Equation 1. During test, $\mathcal{L}_{OCGTL}$(eq. (1)) is used directly as the score function for detecting anomalous graphs. A low loss on a test sample means that the graph is likely normal, whereas a high loss is indicative of an anomaly. One advantage of OCGTL is that its loss makes it more sensitive to different types of anomalies by considering both angles between embeddings and Euclidean distances. In contrast, OCC-based methods typically rely on the Euclidean distance only.

Another advantage of OCGTL over OCC-based approaches is that its training is more robust and the AD model can be more flexible. A known difficulty for training OCC-based deep anomaly detectors (such as deep support vector data description (SVDD) and one-class graph neural network (OCGNN) may be hypersphere collapse. Hypersphere collapse is a trivial optimum of the training objective $$\mathcal{L}_{\text{Ruff et al.}(2018)}(G) = \|f(G) - \theta\|_2^2 \quad (7)$$

which occurs when the feature extractor f maps all inputs exactly into the center $\theta$. The hypersphere then has a radius of zero, and AD may become impossible. Some recommend fixing $\theta$ and avoiding bias terms for f and show good results in practice. However, there is no guarantee that a trivial solution can be avoided under any architecture for f. Here the system may prove that OCGTL overcomes this.

The system may show that the trivial solution $f(G)=\theta$ achieves a perfect OCC loss but is not optimal on the OCGTL loss. Thus OCGTL provably avoids hypersphere collapse even when the center $\theta$ is a trainable parameter. This result makes OCGTL the first deep one-class approach where the center can be trained.

The constant feature extractor, $f(G)=\theta$ for all inputs G, minimizes $\mathcal{L}_{OCC}$ (eq.(3)).

Proof. $0 \leq \mathcal{L}_{OCC}$ is the squared $\ell_2$norm of the distance between the embedding of G and the center $\theta$. Plugging in $f(G)=\theta$ attains the minimum 0.

By using $\mathcal{L}_{GTL}$ to regularize, we can avoid hypersphere collapse.

Proposition 2. When neural transformation learning performs better than random (when $\mathcal{L}_{GTL} < K \log K$) on the training data, then the constant feature extractor of Proposition 1 does not minimize the combined loss $\mathcal{L}_{OCGTL}$ (eq. (1)).

For the constant feature extractor $f_k(G)=\theta$ for all k and all inputs G, $\mathcal{L}_{OCGTL}\mathcal{L}_{GTL}=K \log K$, where K is the number of transformations and $K \log K$ is the negative entropy of randomly guessing the reference embedding. Assume there is a constellation of the model parameters s.c. $\mathcal{L}_{GTL} < K \log K$, i.e. better than random. Since $\theta$ is trainable, we can set it to be the origin. The loss of the optimal solution is at least as good as the loss with $\theta=0$. Set $\epsilon = K \log K - \mathcal{L}_{GTL} =$. The transformations can be manipulated such that their outputs are rescaled and as a result all the embeddings have norm $\|f_k(G)\|_2 < E/K$. As the norm of the embeddings changes, $L_{GTL}$ remains unchanged since the cosine similarity is not sensitive to the norm of the embeddings. By plugging this into eq. (1) we get $L_{OCGTL} = E_{k=1}^{K} \|f_k(G)\|_2 + \mathcal{L}_{GTL} < K \log K$, which is better than the performance of the best constant encoder.

The details above demonstrate that while deep OCC is prone to hypersphere collapse, the same trivial solution is not a minimizer of the combined loss $L_{OCGTL}$. Thus $L_{GTL} < K \log K$ can be tested in practice by training graph transformation learning (GTL) and evaluating the predictive entropy on the training data. In all scenarios we worked with $\mathcal{L}_{GTL} \ll K \log K$ after training.

The main contribution of our work is OCGTL. To study the effectiveness of OCGTL the system may implement the following graph level AD methods as ablations. These methods have not been studied on graphs before, so their implementation is also one of our contributions in this paper and paves the way for future progress.

One-class pooling (OCPool) is a shallow method that uses pooling to construct a graph-level representation from the node features:

$$h_G = \text{POOLING}(x_v|v \in G)$$

This feature extractor may not have parameters and hence requires no training. Anomalies can be detected by training a one-class SVM (OCSVM) on these features. This novel approach for graph-level AD is a simple baseline and may achieve beneficial results (even though it does not use the edge sets E of the graphs). Additionally, it may help determine which pooling function might work best as a readout function (eq. (5)) for GNN-based AD methods.

Graph transformation prediction (GTP) is an end-to-end self-supervised detection method based on transformation prediction. It trains a classifier f to predict which transformation has been applied to a samples and uses the crossentropy loss to score anomalies. We implement GTP with six graph transformations (node dropping, edge adding, edge dropping, attribute masking, subgraph, and identity transformation) originally designed for graph contrastive learning in You et al. (2020).

Graph transformation learning (GTL) is an end-to-end self-supervised detection method using neural transformations. K GNNs, $f_k$ for k=1, . . . , K in addition to the reference feature extractor f are trained on $\mathcal{L}_{GTL}$ (eq. (2)). The loss is used directly to score anomalies. While this method works well in practice, it is not sensitive to the norm of the graph embeddings in eq. (2). The normalization step in computing the cosine similarity makes mean and add pooling equivalent when aggregating the graph representations, and therefore loses the consideration of the norms of graph embeddings. This may put GTL at a disadvantage compared to the other methods presented in this work, which profit from add pooling.

Figure 3:
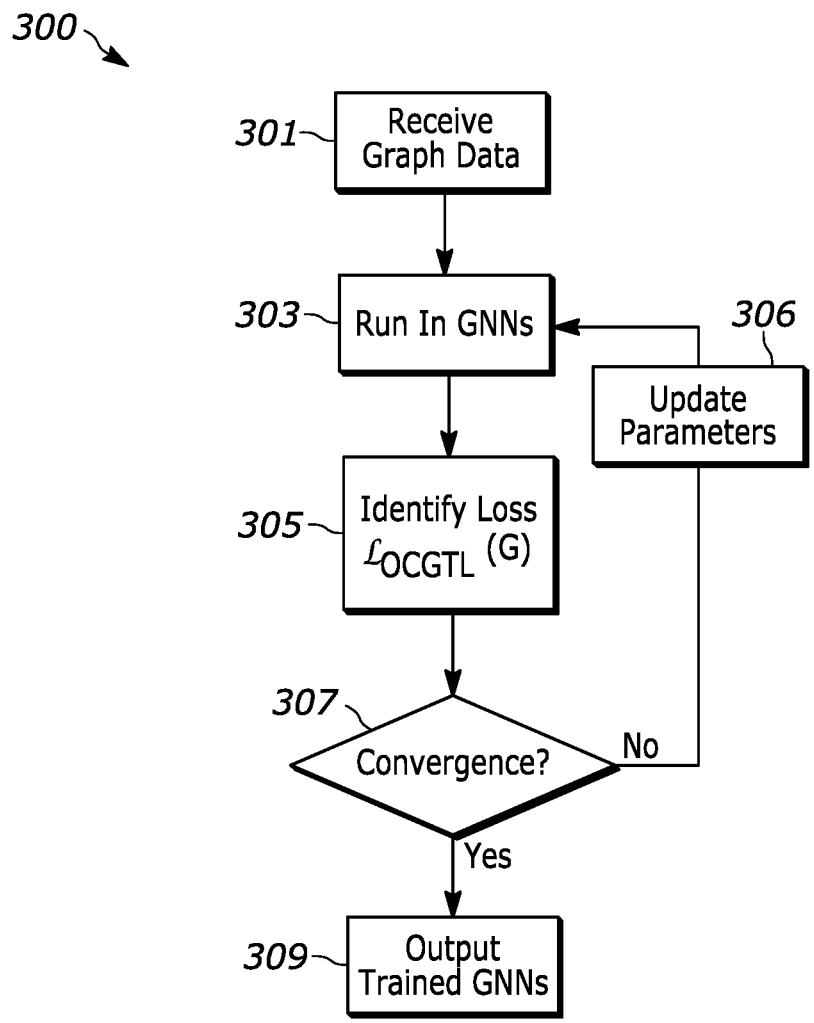
FIG. 3 disclose a flow chart associated with training of a graph neural network according to one embodiment.

FIG. 3 disclose a flow chart associated with the graph neural network according to an embodiment. At step 301, the system may receive input data which includes a graph or plurality of graphs. The graphs may have a variety of nodes to represent various data points associated with an image or other data. At step 303, the system may run the plurality of GNNs to model the graph data. At step 305, may identify a loss associated with each input graph by utilizing the embedding of the graph data produced by the GNNs. The loss is identified using OCGTL, which is explained in detailed above. At decision 307, the system may determine if a convergence threshold is met. At step 309 may output the trained GNN if met or exceeded. Thus, the GNN may be identified as trained if the loss is low. If the loss is still significant and does not fall below the GNN threshold, the system may update parameters 308 associated with the GNN. The system may then identify a loss utilizing the updated parameters and utilizing the graph data. The system may continue to update parameters and evaluate graphical data until the convergence threshold is met.

Figure 4:
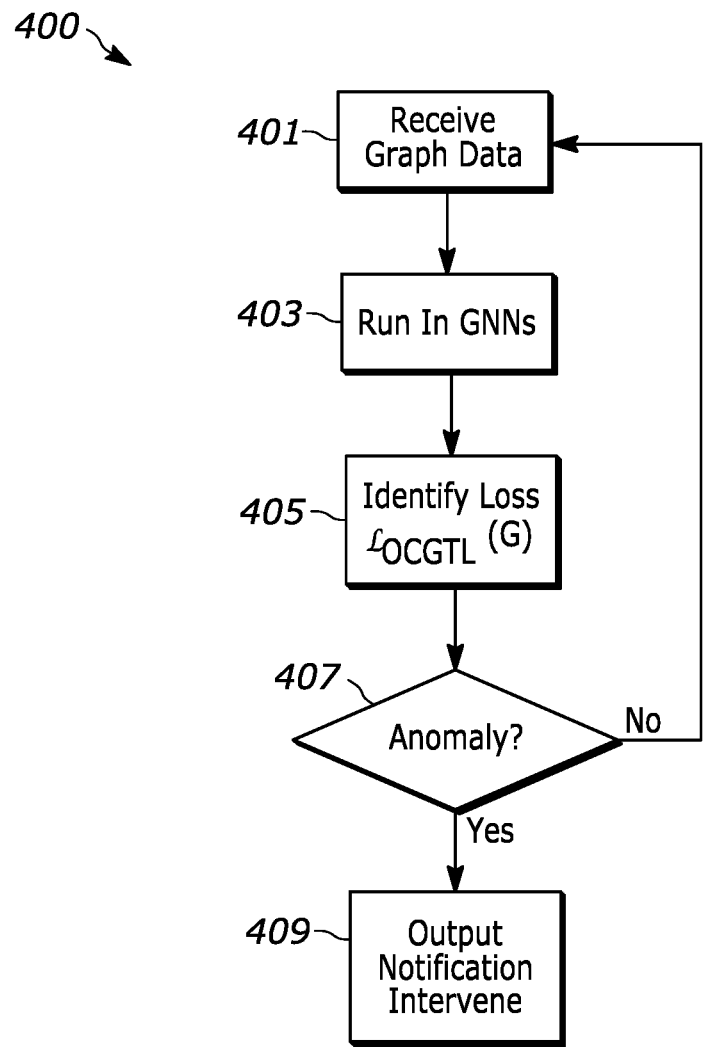
FIG. 4 discloses a flow chart associated with the anomaly detection aspect with respect to a graph neural network.

FIG. 4 discloses a flow chart associated with the anomaly detection aspect with respect to the graph neural network. The anomaly detection may be utilized on a trained GNN or a GNN At step 401, the system may receive input graphical data. The input data may be graphical data, which has a variety of embodiments disclosed. At step 403, the system may run the trained plurality of GNNs model for the graph data. At step 405, the system may identify a loss associated with each input graph by utilizing the embeddings of the graph data produced by the GNNs. The loss is identified using OCGTL. (This loss is the major point of novelty). At decision 407, the system may determine if the loss is above a threshold. At step 409, the system may intervene if the loss is above an anomaly threshold or notify an alert. Thus, the alert may indicate that the anomaly is abnormal. In another embodiment, the system may intervene and end programs or operation if the data indicates an anomaly For example, if there is a fraud identification based on the graphical data indicating fraud, the system may stop a transaction (e.g., wire transfer, credit card transfer, payment, etc.). If the loss is below the threshold, the system may assume it is a normal dataset or activity, and thus simply continue to monitor and run data through the trained GNN.

This technology can be applied to other graphical data as indicated and provided in FIGS. 5-11. These figures, FIGS. 5-11 illustrate exemplary embodiments however the concepts of this disclosure may be applied to additional embodiments. Some exemplary embodiments include: Industrial applications in which the modalities may include video, weight, IR, 3D camera, and sound; power tool or appliance applications in which the modalities may include torque, pressure, temperature, distance, or sound; medical applications in which the modalities may include ultrasound, video, CAT scan, MRI, or sound; robotic applications in which the modalities may include video, ultrasound, LIDAR, IR, or Sound; and security applications in which the modalities may include video, sound, IR, or LIDAR. The modalities may have diverse datasets for example, a video dataset may include an image, a LIDAR dataset may include a point cloud, and a microphone dataset may include a time series.

The technology disclosed here can be used by operating on any type of graphical data, which may be obtained by receiving sensor signals, e.g GPS signals of vehicles, or emissions of engine. The graphical data may be associated with social network data or snapshots of financial network data. Graphical data may be utilized for models of typical driving behavior, of typical pollution levels over time, or of the dynamics of an engine can help both lawmakers and/or automotive engineers to develop solutions for cleaner mobility.

Figure 5:
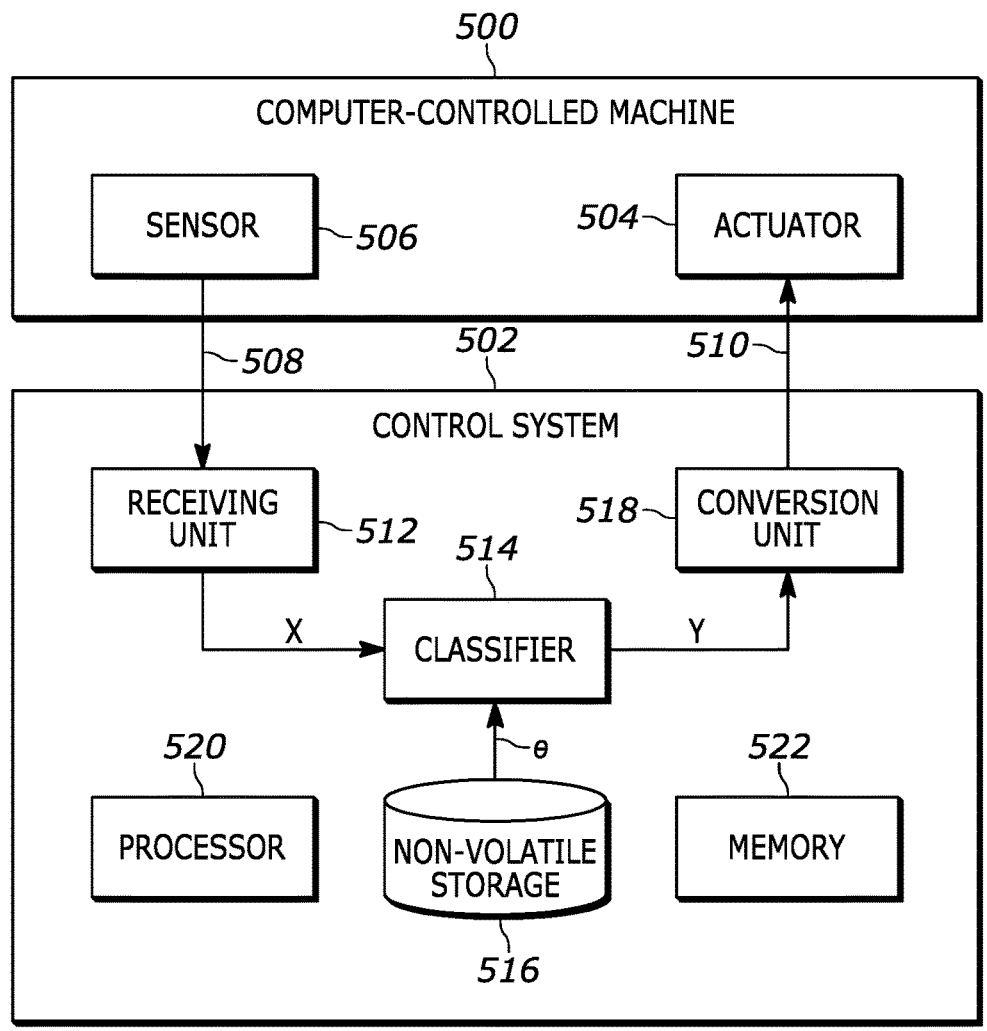
FIG. 5 depicts a schematic diagram of an interaction between a computer-controlled machine and a control system, according to an embodiment.

The machine-learning models described herein can be used in many different applications, and not just in the context of road sign image processing. Additional applications where image quantization may be used are shown in FIGS. 6-11. Structure used for training and using the machine-learning models for these applications (and other applications) are exemplified in FIG. 5. FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine learning (ML) algorithm, such as a neural network described above. Classifier 514 is configured to be parametrized by parameters, such as those described above (e.g., parameter 0). Parameters 0 may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine-learning algorithms, such as those described above with regard to pre-trained classifier 306) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
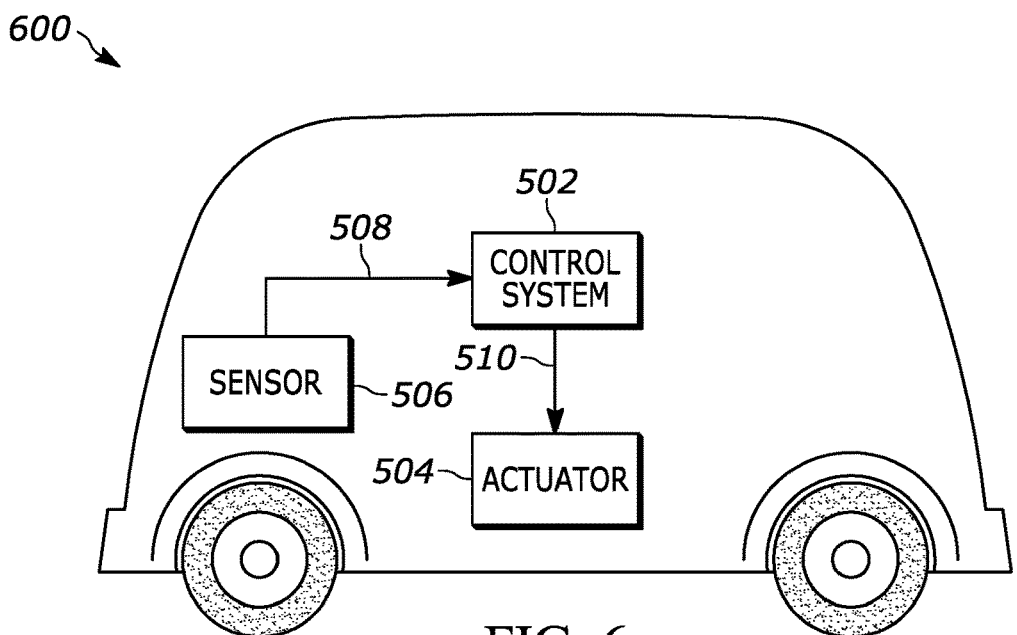
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. In the context of sign-recognition and processing as described herein, the sensor 506 is a camera mounted to or integrated into the vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
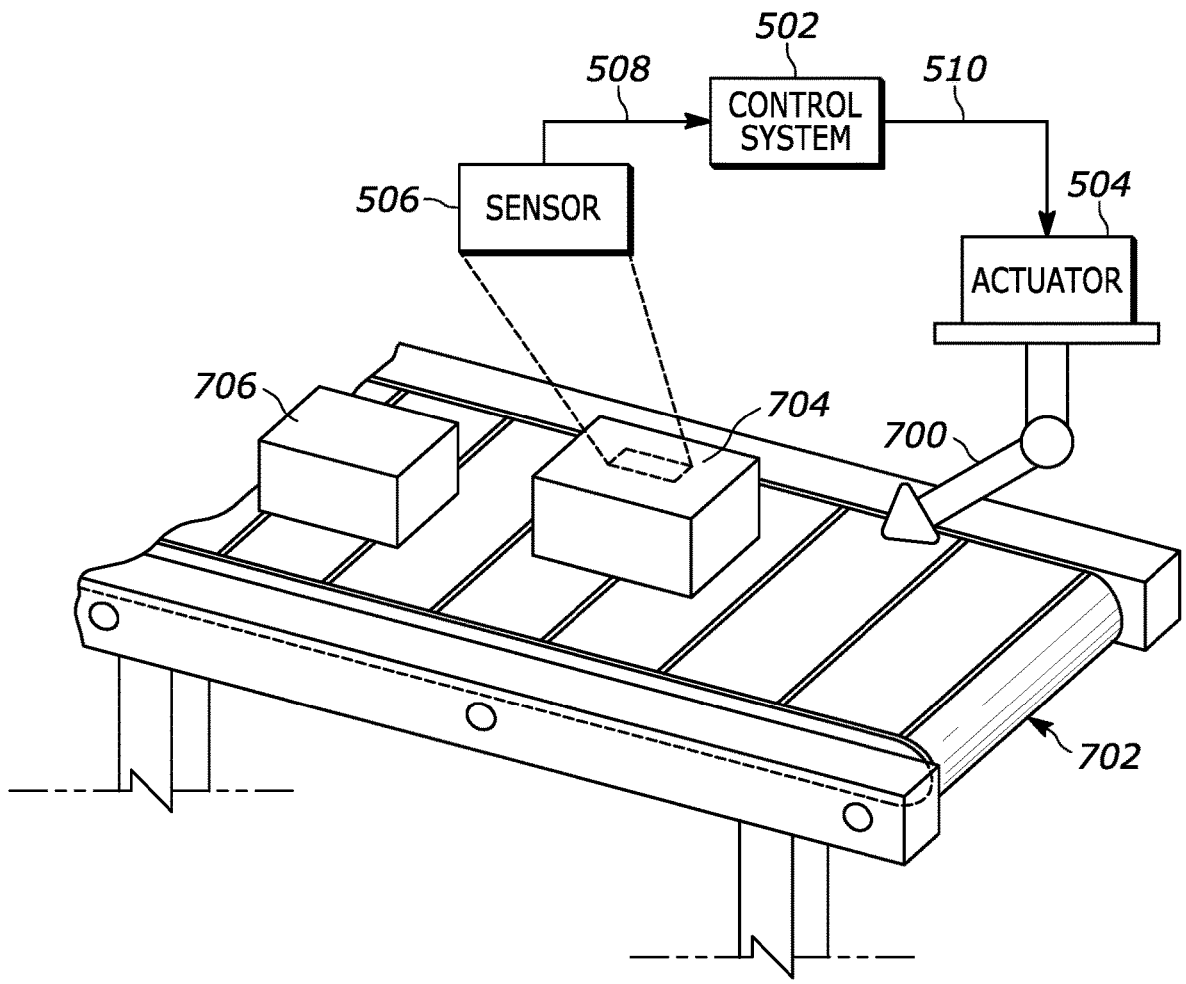
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 106 of system 700 (e.g., manufacturing machine) depending on the determined state of manufactured product 704.

Figure 8:
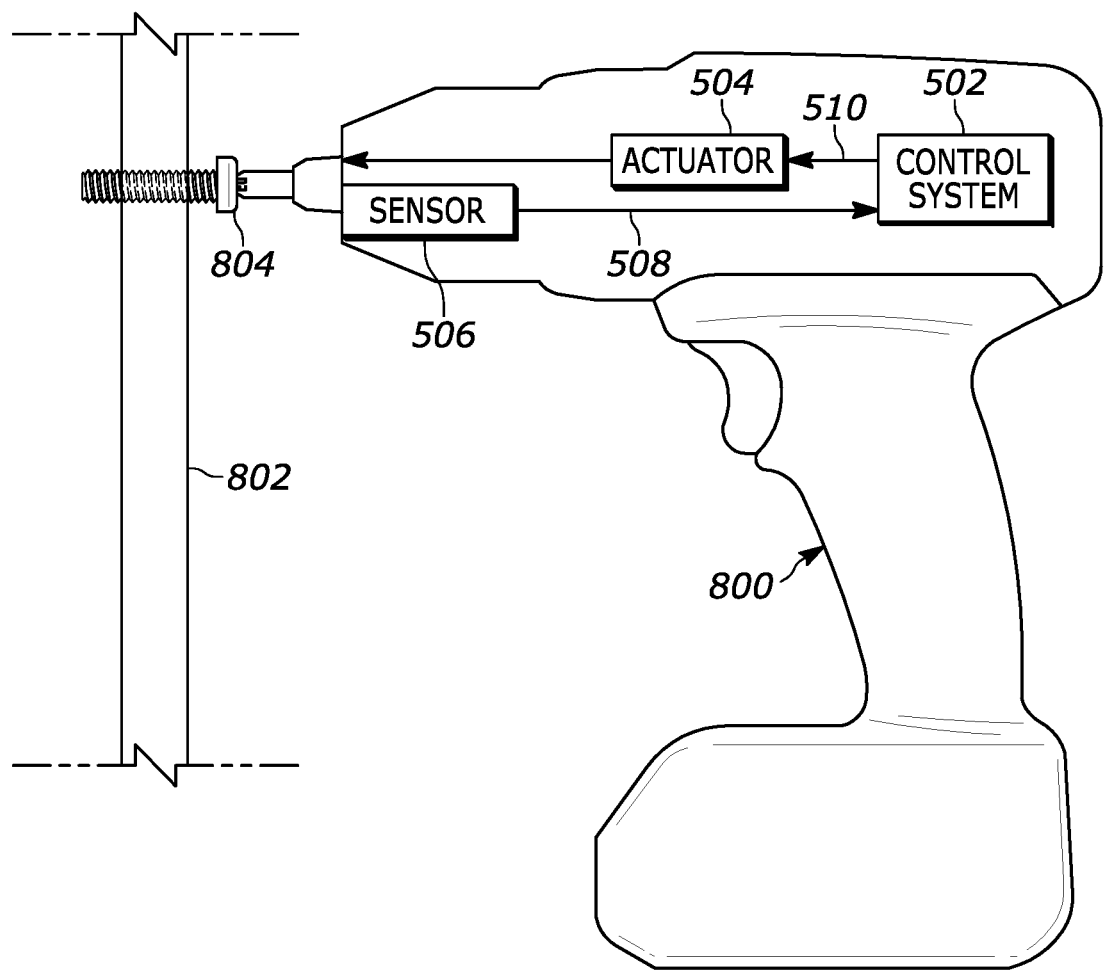
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
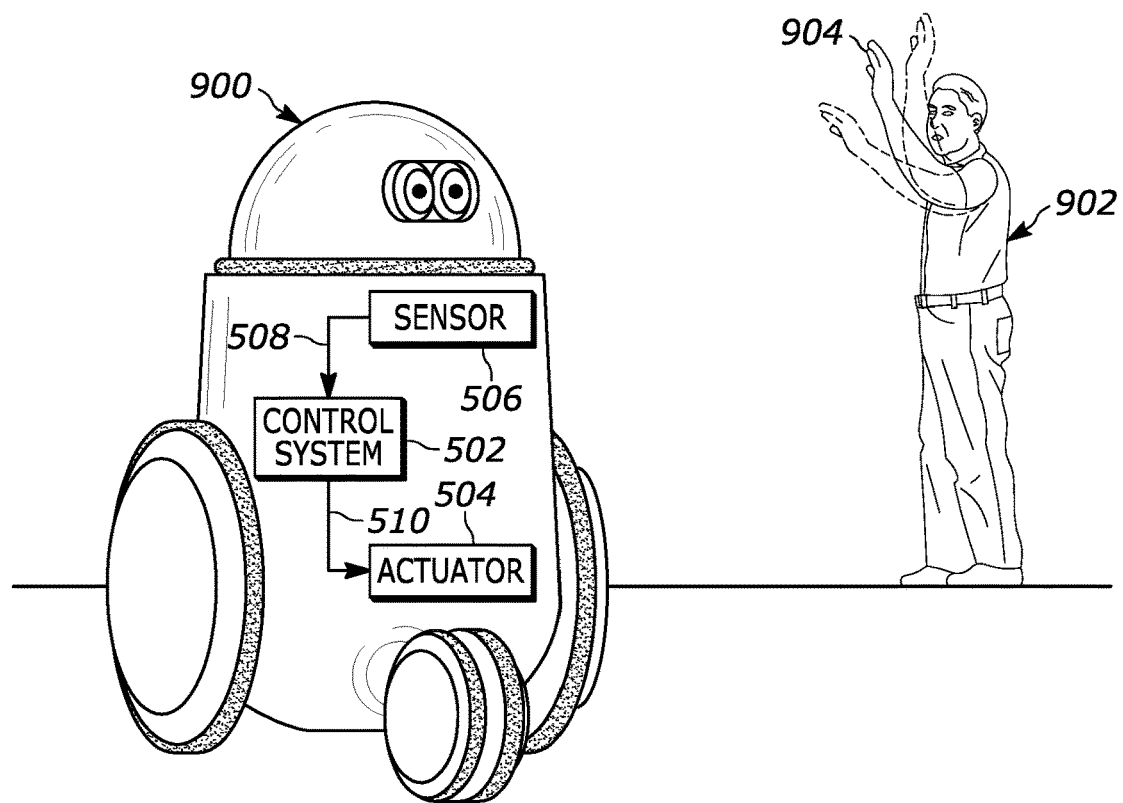
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
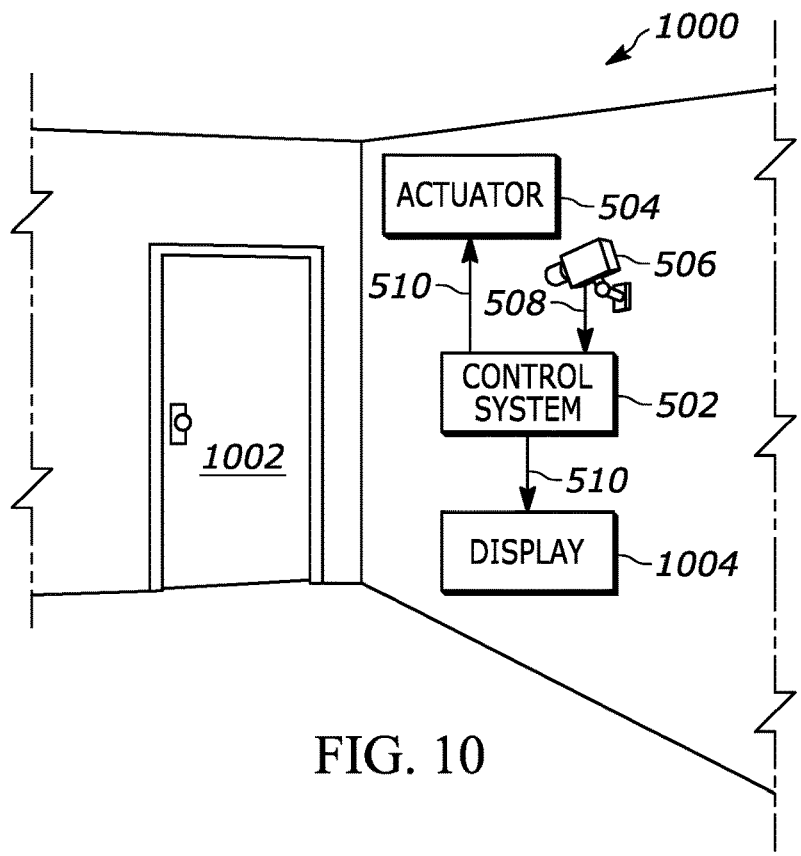
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects identified as anomalies.

Figure 11:
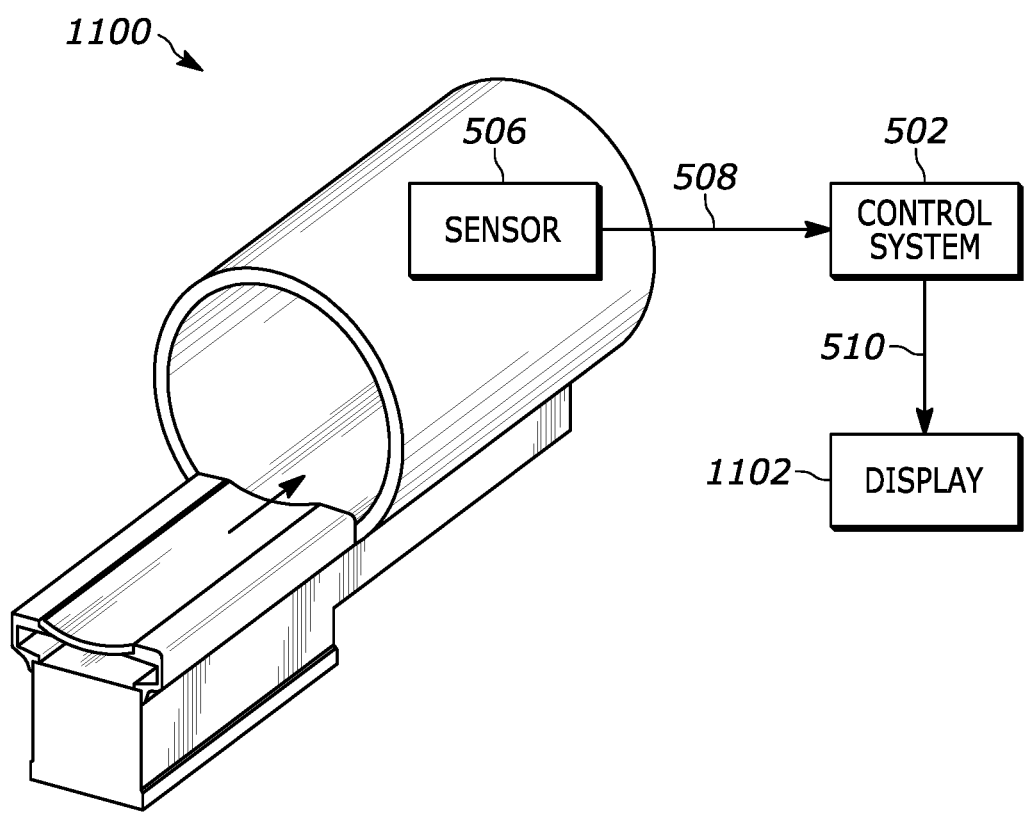
FIG. 11 depicts a schematic diagram of the control system of FIG. 5 configured to control an imaging system, for example an MM apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A computer-implemented method of anomaly detection associated with graphical data, comprising:
receiving as input one or more input data sets, wherein the input data sets includes one or more graphs;
utilizing a plurality of graph neural networks (GNNs) to identify an aggregate loss including a first loss and second loss associated with the input data set, wherein the aggregate loss is associated with embeddings of the input graphs produced by the GNNs, wherein the first loss is associated with a Euclidean distance and a second loss is associated angles between embeddings of the input graphs;
training a plurality of feature extractors associated with the plurality of graph neural networks in response to the aggregate loss, wherein the plurality of feature extractors associated with the plurality of graph neural networks are trained jointly; and
outputting a notification associated with an anomaly detection when the first and second loss exceeds an anomaly-detection threshold.

2. The computer-implemented method of claim 1, wherein the first loss is a one-class classification term.

3. The computer-implemented method of claim 1, wherein the method further includes the step of intervening in response to the anomaly detection.

4. The computer-implemented method of claim 1, wherein the method further includes the step of updating parameters associated with the GNNs and identifying one or more losses associated with the input data set in response to the falling below the convergence threshold.

5. The computer-implemented method of claim 1, wherein the graph neural networks are trained graph neural networks.

6. The computer-implemented method of claim 1, wherein the graphical data is associated with one or more images.

7. A computer-implemented method of anomaly detection associated with graphical data, comprising:
receiving as input one or more input data sets, wherein the input data sets include one or more graphs;
utilizing a plurality of graph neural networks to identify a loss associated with the input data set, wherein the loss utilizes one or more embeddings associated with the one or more graphs;
training a plurality of feature extractors associated with the plurality of graph neural networks based on the loss, wherein the plurality of feature extractors associated with the plurality of graph neural networks are trained jointly; and
outputting a trained graph neural network in response to the loss exceeding a convergence threshold.

8. The computer-implemented method of claim 7, wherein the loss includes a first loss that is a one-class classification loss and a second loss that is a contrastive loss of the one or more embeddings.

9. The computer-implemented method of claim 7, wherein the training includes jointly training the feature extractors.

10. The computer-implemented method of claim 7, wherein the method further includes the step of updating parameters associated with the graph neural networks and identifying one or more losses associated with the input data set in response to the falling below the convergence threshold.

11. The computer-implemented method of claim 7, wherein the loss includes a first loss that is a one-class classification loss.

12. The computer-implemented method of claim 7, wherein the graphical data is associated with one or more pixels.

13. A system including a machine-learning network, comprising:
an input interface configured to receive input data including graphical representations;
a processor, in communication with the input interface, wherein the processor is programmed to:
receive as input one or more input data sets, wherein the input data sets include one or more graphs;
utilize a plurality of graph neural networks to identify a first loss and second loss associated with the input data set;
train a plurality of feature extractors associated with the plurality of graph neural networks in response to the first and second loss, wherein the plurality of feature extractors associated with the plurality of graph neural networks are trained jointly; and
output a trained plurality of graph neural networks in response to the first and second loss exceed a convergence threshold.

14. The system of claim 13, wherein the second loss is a contrastive loss of embeddings.

15. The system of claim 13, wherein the loss includes a first loss that is a one-class classification loss.

16. The system of claim 13, wherein the processor is further programmed to update parameters associated with the graph neural networks when the first and second loss fall below the convergence threshold.

17. The system of claim 13, wherein the graphical representations is associated with a plurality of nodes and edges and node features.

18. The system of claim 13, wherein the graphical representations are associated with social network data or financial network data.

19. The system of claim 13, wherein the graphical data is associated with one or more pixels.

* * * * *